US012021423B2

(12) United States Patent
Nakashima et al.

(10) Patent No.: US 12,021,423 B2
(45) Date of Patent: Jun. 25, 2024

(54) DYNAMO-ELECTRICAL MACHINE

(71) Applicant: Hitachi Astemo Electric Motor Systems, Ltd., Hitachinaka (JP)

(72) Inventors: Teruaki Nakashima, Hitachinaka (JP); Takayuki Koizumi, Hitachinaka (JP); Hidenori Okada, Hitachinaka (JP); Koji Kawanami, Hitachinaka (JP); Kazuhisa Sato, Hitachinaka (JP)

(73) Assignee: HITACHI ASTEMO ELECTRIC MOTOR SYSTEMS, LTD., Hitachinaka (JP)

( * ) Notice: Subject to any disclaimer, the term of this patent is extended or adjusted under 35 U.S.C. 154(b) by 311 days.

(21) Appl. No.: 17/605,727

(22) PCT Filed: May 30, 2019

(86) PCT No.: PCT/JP2019/021468
§ 371 (c)(1),
(2) Date: Oct. 22, 2021

(87) PCT Pub. No.: WO2020/240762
PCT Pub. Date: Dec. 3, 2020

(65) Prior Publication Data
US 2022/0181938 A1 Jun. 9, 2022

(51) Int. Cl.
*H02K 3/12* (2006.01)
*H02K 3/24* (2006.01)
(Continued)

(52) U.S. Cl.
CPC ............... *H02K 3/12* (2013.01); *H02K 3/24* (2013.01); *H02K 3/28* (2013.01); *H02K 3/52* (2013.01)

(58) Field of Classification Search
CPC .. H02K 3/12; H02K 3/24; H02K 3/28; H02K 3/52
See application file for complete search history.

(56) References Cited

U.S. PATENT DOCUMENTS

| 2004/0000832 A1* | 1/2004 | Isogai | H02K 3/28 310/184 |
|---|---|---|---|
| 2004/0007931 A1 | 1/2004 | Gorohata et al. | |

(Continued)

FOREIGN PATENT DOCUMENTS

| JP | 2004-032882 A | 1/2004 |
|---|---|---|
| JP | 2004-088993 A | 3/2004 |

(Continued)

OTHER PUBLICATIONS

Office Action issued in corresponding Japanese Patent Application No. 2021-521679, with English Machine Translation dated Apr. 11, 2023 (6 pages).

(Continued)

*Primary Examiner* — Tulsidas C Patel
*Assistant Examiner* — Mohammed Ahmed Qureshi
(74) *Attorney, Agent, or Firm* — Foley & Lardner LLP

(57) ABSTRACT

A novel dynamo-electrical machine is provided that can inhibit an increase in the height of a coil end positioned toward a turn portion and improve the cooling performance around the turn portion of a segment coil. A segment coil 31 includes a first linear portion 34r, a second linear portion 34a, and a turn portion 33 including a top portion 33c. The first linear portion 34r is inserted into a specified slot 22. The second linear portion 34a is inserted into another particular slot 22 different from the specified slot 22. The turn portion 33 extends from one end face portion of a stator core 21 toward the outside of the axial direction of the stator core 21 and connects the first linear portion 34r and the second linear portion 34a. The linear portions 34r and 34a of the multiple segment coils 31 are inserted and placed in the slots 22 in a layering manner from the inner periphery to the outer periphery in the radial direction. A bent portion 37 is formed between each of the linear portions 34r and 34a and the turn (Continued)

portion of the segment coils 31 layered in the radial direction. The bent portion 37 tilts the top portion 33c of the turn portion 33 toward the end face of the stator core 21.

8 Claims, 12 Drawing Sheets

(51) Int. Cl.
*H02K 3/28* (2006.01)
*H02K 3/52* (2006.01)

(56) References Cited

U.S. PATENT DOCUMENTS

| | | |
|---|---|---|
| 2004/0041491 A1 | 3/2004 | Gorohata et al. |
| 2010/0253161 A1 | 10/2010 | Kuroyanagi |
| 2011/0001373 A1* | 1/2011 | Mori ............ H02K 3/50 310/71 |
| 2014/0292119 A1* | 10/2014 | Takahashi ............ H02K 3/12 310/214 |
| 2015/0295477 A1* | 10/2015 | Koizumi ............ H02K 3/12 310/68 C |
| 2018/0048203 A1 | 2/2018 | Ohguchi et al. |

FOREIGN PATENT DOCUMENTS

| | | |
|---|---|---|
| JP | 2012-175748 A | 9/2012 |
| JP | 2013-121296 A | 6/2013 |
| JP | 2014-197968 A | 10/2014 |
| JP | 2017-189020 A | 10/2017 |
| JP | 2018-026964 A | 2/2018 |
| WO | WO-2009/084473 A1 | 7/2009 |

OTHER PUBLICATIONS

International Search Report with English translation and Written Opinion issued in corresponding application No. PCT/JP2019/021468 dated Aug. 13, 2019.

Extended European Search Report issued in corresponding European Patent Application No. 19930552.5 dated Dec. 2, 2022 (11 pages).

* cited by examiner

DYNAMO-ELECTRICAL MACHINE

TECHNICAL FIELD

The present invention relates to a dynamo-electrical machine, and more particularly to a dynamo-electrical machine including a stator core having multiple slots and a stator having multiple segment coils housed in the slots of the stator core.

BACKGROUND ART

Electric vehicles and hybrid vehicles use a dynamo-electrical machine to acquire the driving force. The dynamo-electrical machine includes a stator core having multiple slots and a stator having multiple copper segment coils housed in the slots of the stator core. The dynamo-electrical machine equipped with such a stator is described in Japanese Patent Application Laid-Open No. 2017-189020 (PTL 1), for example.

The dynamo-electrical machine described in PTL 1 includes a stator core having multiple axially extending slots on the inner peripheral surface, and a copper segment coil inserted into the slot. The segment coil protrudes axially from an end face portion of the stator core. A parallel portion approximately parallel to the end face portion of the stator core is formed on the top portion of a bent-side portion (so-called turn portion) at the coil end of the segment coil.

Based on the parallel portion as a boundary, one intermediate slope portion is formed with a slope containing one predetermined angle. The other intermediate slope portion is formed with a two-step slope containing two different predetermined angles.

The segment coil according to this configuration can provide the stator of a dynamo-electrical machine that avoids mechanical interference between adjacent coils and reduces the coil end length at the bent-side coil end of the segment coil.

CITATION LIST

Patent Literature

PTL 1: Japanese Patent Application Laid-Open No. 2017-189020

SUMMARY OF INVENTION

Technical Problem

This type of dynamo-electrical machine includes a turn portion forming the bent-side coil end of the segment coil protruding from the end face portion of the stator core and a turn portion at the bent-side coil end of the adjacent segment coil. When a spatial distance between these turn portions is small, the coil, supplied with the current, generates heat that hardly dissipates into the cooling medium such as air or oil. The electrical resistance of the coil may increase to degrade the performance of the dynamo-electrical machine.

An available solution increases the spatial distance between the end face portion of the stator core and the turn portion of the segment coil to increase a contact area where the cooling medium contacts the turn portion. However, there is an issue of increasing the height of the turn portion, namely, the length of the bent-side coil end to bottleneck the miniaturization. Therefore, there is a need for a dynamo-electrical machine that can sufficiently cool the bent-side coil end without increasing the length of the bent-side coil end.

It is an object of the present invention to solve the above-described issue in this type of the dynamo-electrical machine.

Namely, an object of the present invention is to provide a novel dynamo-electrical machine that can inhibit an increase in the length of a coil end positioned toward a turn portion and improve the cooling performance around the turn portion of a segment coil.

Solution to Problem

As features of the present invention, a segment coil includes a first linear portion, a second linear portion, and a turn portion including a top portion. The first linear portion is inserted into a specified slot. The second linear portion is inserted into another particular slot different from the specified slot. The turn portion extends from one end face portion of the stator core toward the outside of the axial direction of the stator core and connects the first linear portion and the second linear portion. The linear portions of the multiple segment coils are inserted and placed in the slots in a layering manner from the inner periphery to the outer periphery in the radial direction. A bent portion is formed between the linear portion and the turn portion of each of the segment coils layered in the radial direction. The bent portion tilts the top portion of the turn portion toward the end face of the stator core.

Advantageous Effects of Invention

According to the present invention, the turn portion extending from the end face portion of the stator core is bent outward in a radial direction to form a sufficient gap between the turn portions of each segment coil. A cooling medium can easily enter the gap. An effective contact area between the coil and the cooling medium increases. The cooling performance can be improved.

DESCRIPTION OF EMBODIMENTS

Embodiments of the present invention will be described in further detail with reference to the accompanying drawings. However, the present invention is not limited to the embodiments described below. The scope of the present invention also includes various modifications and applications in the technological concept of the present invention.

Figure 1:
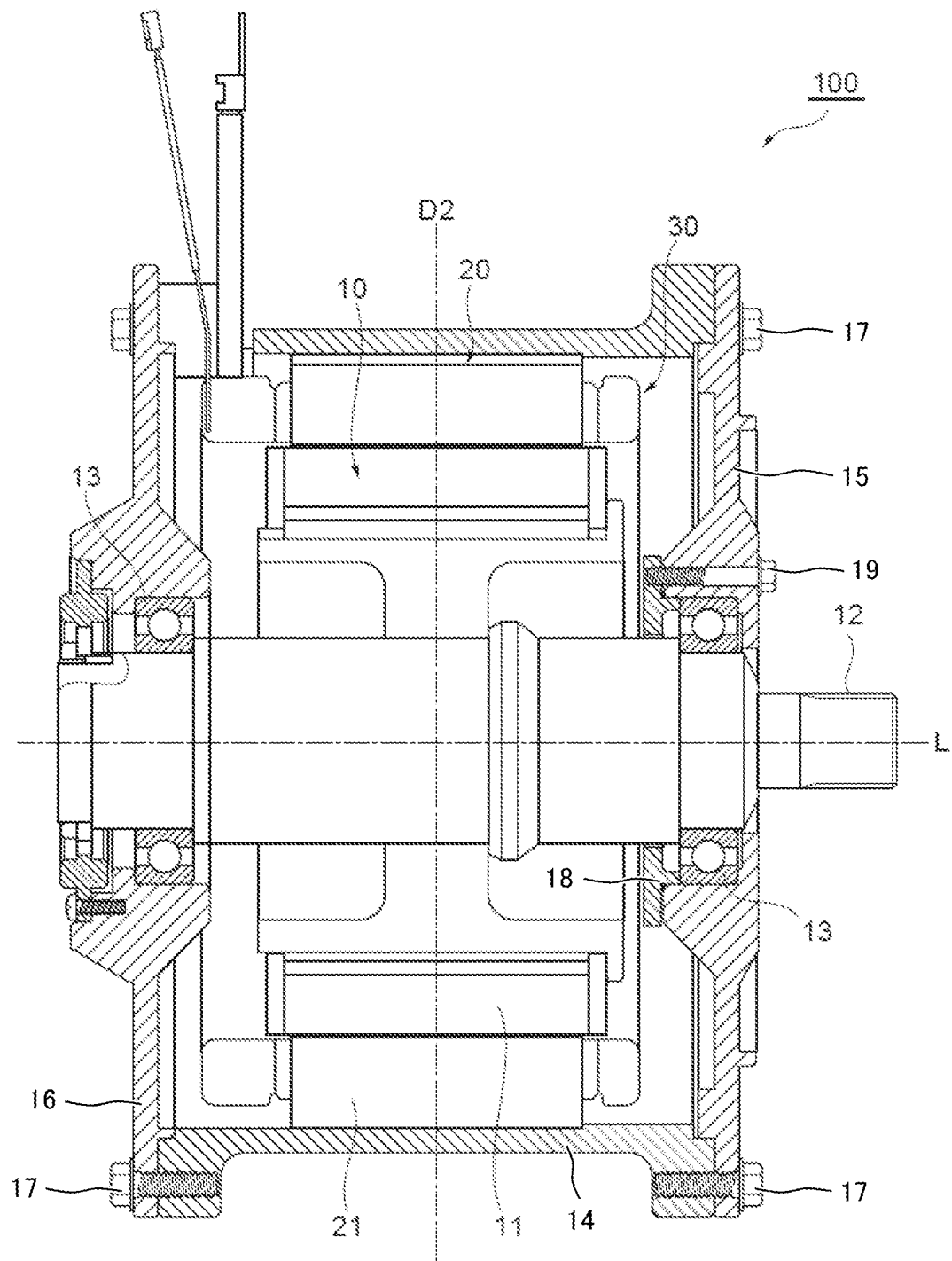
FIG. 1 is a cross-section illustrating an axial cross-section of a dynamo-electrical machine according to the present invention.

FIG. 1 is a cross-section of a dynamo-electrical machine 100 according to the present invention. The dynamo-electrical machine 100 according to the present embodiment is mounted on automobiles such as an electric vehicle having no internal combustion engine and a hybrid vehicle having an internal combustion engine. The dynamo-electrical machine 100 functions as an electric motor to generate driving force and functions as an electricity generator to generate electricity when braking is applied to the automobile, for example. The generated electric power is stored in a battery mounted on the automobile, for example.

The dynamo-electrical machine 100 mainly includes a rotor 10 and a stator 20. The rotor 10 and the stator 20 are contained in a storage space formed by an annular housing 14 having openings on both sides, and a front cover 15 and a rear cover 16 to close the openings on both sides of the housing 14. Bolts 17 secure the front cover 15 and the rear cover 16 to the housing 14.

The rotor 10 includes a rotor core 11 and a drive shaft 12, for example. The rotor core 11 is approximately shaped to be cylindrical and is configured by layering multiple plate-like magnetic steel sheets in the direction of axis line L. The drive shaft 12 is secured inside the center of the rotor core 11. Although not illustrated, the rotor core 11 includes multiple magnet insertion holes and multiple magnets (neodymium magnets or ferrite magnets). The magnet insertion holes are provided at equal intervals in the circumferential direction. The magnets are inserted and secured in the magnet insertion holes.

The drive shaft 12 is rotatably supported by two bearings 13 located at both ends and is rotated integrally with the rotor core 11 around axis line L of the rotor core 11. The bearing 13 is placed inside the front cover 15 and the rear cover 16. The bearing 13 toward the front cover 15 is supported by a retainer 18 that is secured to the front cover 15 by a bolt 19. The drive shaft 12 applies a rotational force to a drive wheel (unshown) via a deceleration mechanism (unshown) and is given a rotational force from the drive wheel.

The stator 20 includes an approximately annular stator core 21 and a coil 30, for example. The stator core 21 is configured by layering multiple plate-like magnetic steel sheets along the direction of axis line L. The coil 30 is wound around the stator core 21.

The rotor core 11 is rotatably placed inside the stator core 21 while maintaining a small gap in radial direction D2 of the stator core 21. Axis line L of the stator core 21 coincides with axis line L of the rotor core 11. The dynamo-electrical machine according to these configurations is known well and further description is omitted for brevity.

Figure 2:
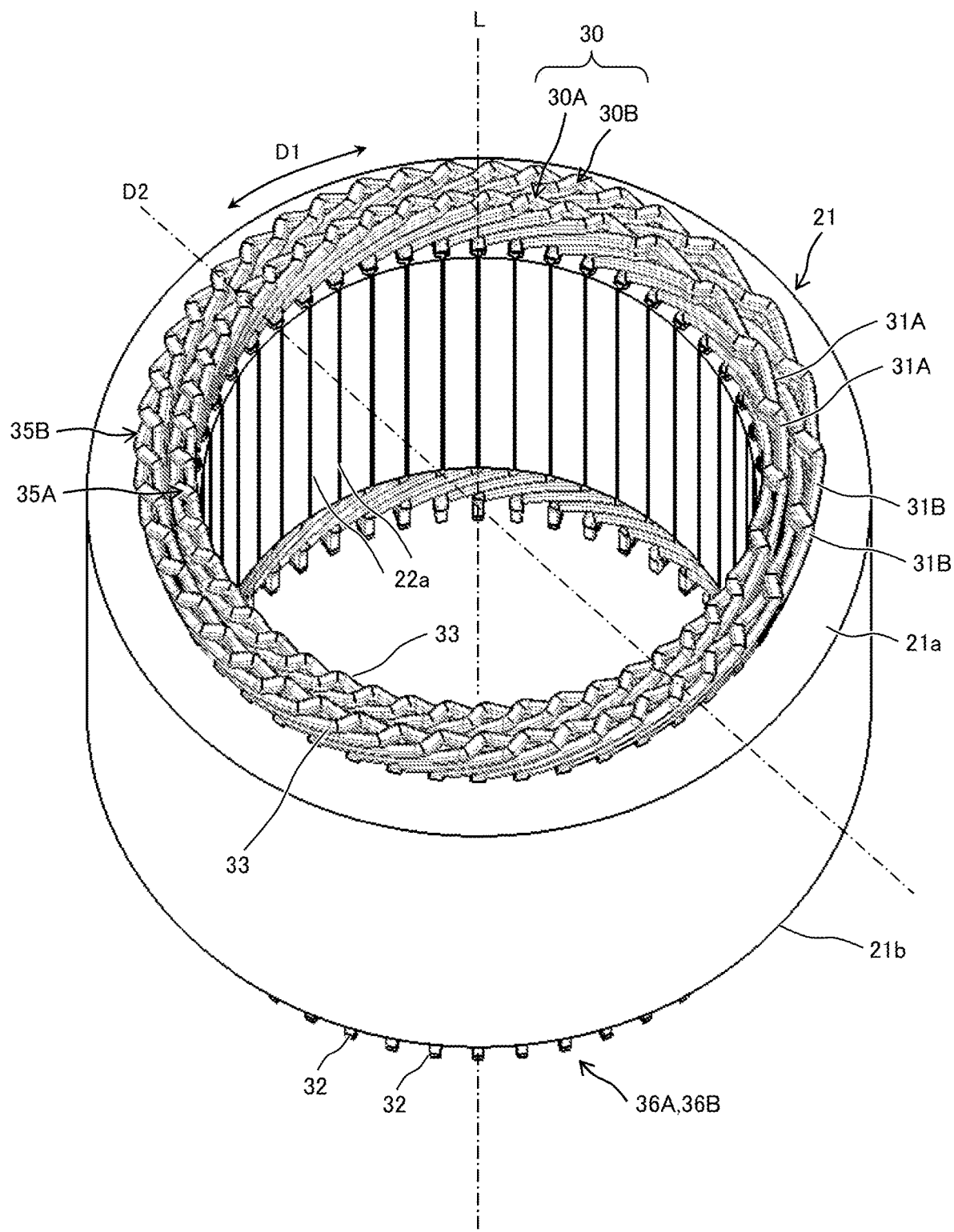
FIG. 2 is a perspective view of a stator of the dynamo-electrical machine illustrated in FIG. 1 diagonally viewed from above.

FIG. 2 illustrates the stator 20 that is taken out of the dynamo-electrical machine 100 illustrated in FIG. 1 and is viewed diagonally from above. In FIG. 2, multiple slit-like slots 22 (see FIG. 4) are provided on the inner periphery of the annular stator core 21. The slots 22 are equidistantly placed in circumferential direction D1 and radially extend outward in radial direction D2.

When viewed in the direction of axis line L of the stator core 21, the slot 22 penetrates from one end face portion 21a to the other end face portion 21b along the direction of axis line L of the stator core 21. The inner peripheral surface of the stator core 21 includes an opening (slit) 22a that continues from one end face portion 21a to the other end face portion 21b in the direction of axis line L.

For example, the stator core 21 includes 48 slots 22 formed at equal angles in circumferential direction D1. Each slot 22 is provided with the coil 30. The slots 22 are radially formed on the stator core 21 around axis line L.

As illustrated in FIG. 2, the coil 30 of the stator 20 is composed of a first coil group 30A and a second coil group 30B. The first coil group 30A is placed on the inner periphery in radial direction D2 of the stator core 21. The second coil group 30B is placed on the outer periphery of the first coil group 30A. The first coil group 30A and the second coil group 30B are aggregates of copper segment coils 31A and 31B.

In the direction of axis line L of the stator core 21, coil ends 35A and 35B at one end of coil 30 are composed of a turn portion 33 (see FIG. 3) of the segment coils 31A and 31B configuring the first coil group 30A and the second coil group 30B. Coil ends 36A and 36B at the other end of the coil 30 are composed of a connecting portion 32 to connect the corresponding segment coils 31A and 31B of the same phase.

Figure 3:
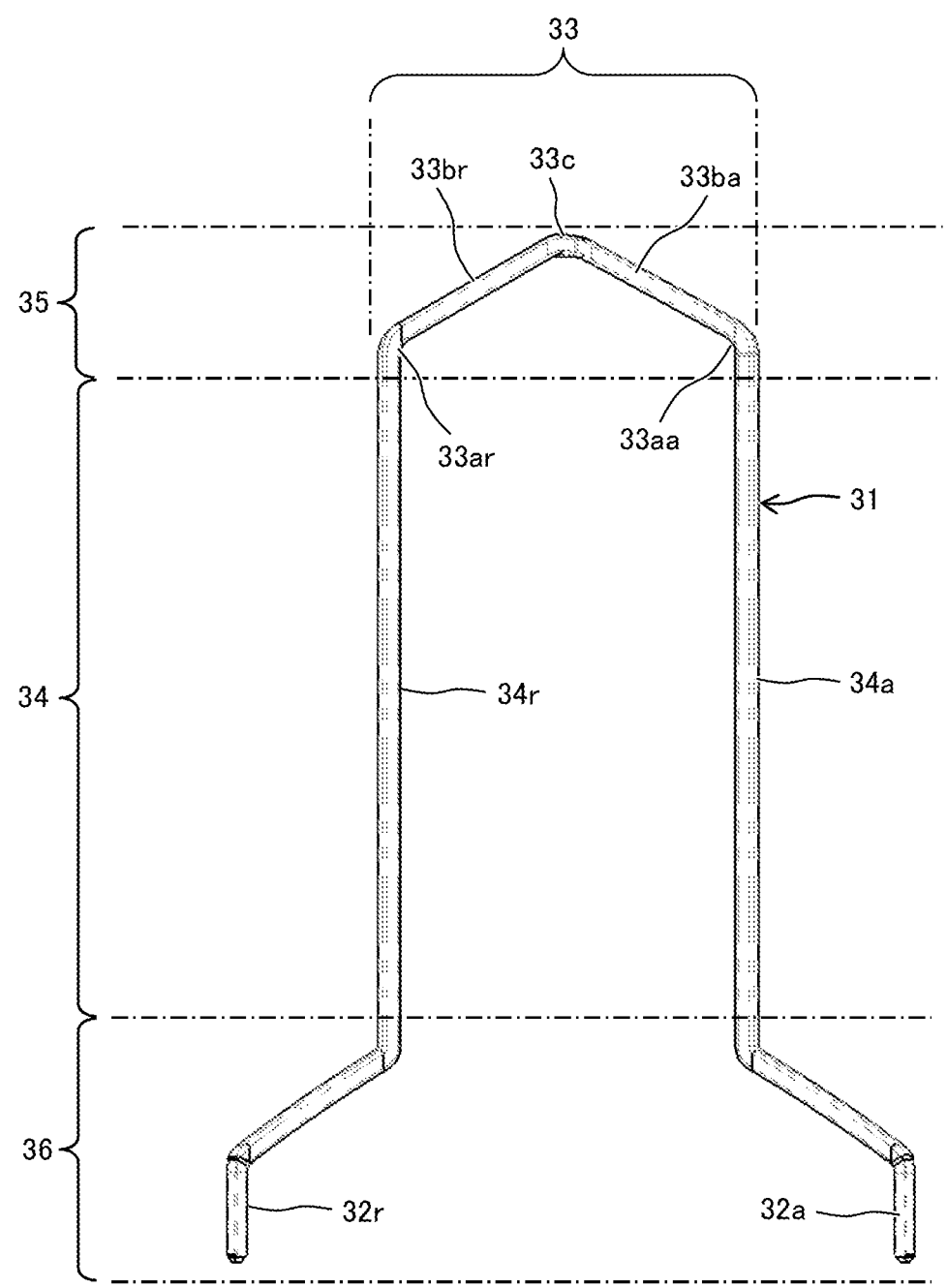
FIG. 3 is a front view illustrating the shape of the segment coil illustrated in FIG. 2.

The turn portion 33 corresponds to the bent-side coil ends 35A and 35B. The connecting portion 32 corresponds to the connection-side coil ends 36A and 36B. A slot insertion portion 34 is provided therebetween (see FIG. 3). As illustrated in FIG. 3, the slot insertion portion 34 may also be denoted as a linear portion 34.

The connecting portion 32 successively connects the segment coils 31A and 31B and connects the adjacent connection-side coil ends 36A and 36B in each coil group through the use of TIG welding. Namely, the connecting portions 32 of the adjacent segment coils 31A in the first coil group 30A are successively connected. The connecting portions 32 of the adjacent segment coils 31B in the second coil group 30B are successively connected. These configurations are also known well and further description is omitted for brevity.

The bent-side coil end 35 protrudes from one end face portion 21a of the stator core 21 in the direction of axis line L of the stator core 21. The shape of the turn portion 33 of segment coil 31 configuring the coil 30 is important to improve the cooling performance of the bent-side coil end 35.

Example 1

The description below explains in detail the configurations of the turn portion 33 of the segment coil 31 as a feature of the dynamo-electrical machine 100 according to the present embodiment by reference to the drawings.

FIG. 3 illustrates the shape of the segment coils 31A and 31B. The segment coils 31A and 31B are formed in substantially the same shape. Therefore, the configurations of the segment coils 31A and 31B will be described together. However, when inserted into the slot 22, the segment coils 31A and 31B differ from each other in the turn portions 33 that are bent outward in the radial direction. This will be explained in detail by reference to FIG. 9.

In FIG. 3, the segment coil 31 includes a pair of linear portions 34a and 34r placed in the slot 22. The turn portion 33 is formed to connect one end of each of the linear portions 34a and 34r. The other end of each of the linear portions 34a and 34r is opened to form connecting portions 32a and 32r. Consequently, the bent-side coil end 35 and the connection-side coil end 36 are formed.

A top portion 33c is formed approximately at the center of the turn portion 33. When the segment coil 31 is assembled in the stator core 21, the top portion 33c is formed so that a row of the top portions 33c of the segment coils 31 assembled in the stator core 21 is parallel to the core end face portion 21a.

One side of the top portion 33c is connected to the linear portion 34a via an intermediate slope portion 33ba. The other side of the top portion 33c is connected to the linear portion 34r via an intermediate slope portion 33br. When viewed in the radial direction, the turn portion 33 has an "inverted V" shape under the condition that the segment coil 31 is placed in slot 22.

A connecting portion 33aa between the intermediate slope portion 33ba and the linear portion 34a is bent. A connecting portion 33ar between the intermediate slope portion 33br and the linear portion 34r is bent. The pair of linear portions 34a and 34r is connected via the intermediate slope portion 33ba, the top portion 33c, and the intermediate slope portion 33br. Therefore, the segment coil 31 is approximately formed in a "U" shape composed of the pair of linear portions 34a and 34r and, the turn portion 33 bent to connect the linear portions 34a and 34r.

The pair of linear portions 34a and 34r is placed in two slots 22 that are separated by a specified number of pitches corresponding to the segment coil 31. In this state, the linear portion 34a is located forward in the clockwise direction. The linear portion 34r is located backward in the clockwise direction.

Figure 4:
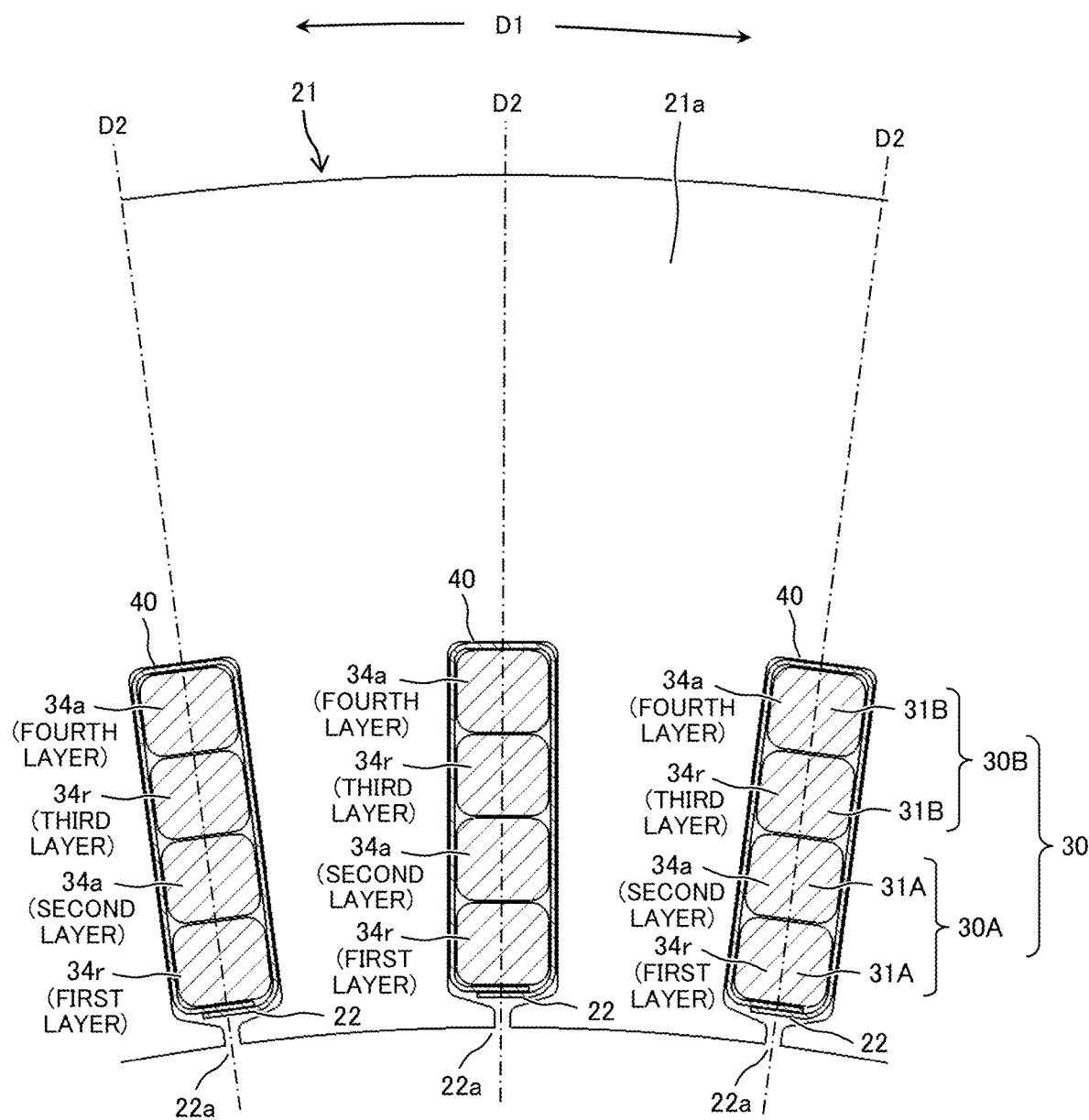
FIG. 4 is a partially enlarged cross-section of an end face portion of a stator core as a plane orthogonal to an axis line of the stator core illustrated in FIG. 2.

As will be described later, the slot 22 holds the linear portions 34a and 34r of the segment coils 31A and 31B forming the first coil group 30A and the second coil group 30B in a layering manner in the radial direction. FIG. 4 illustrates a layered state that will be described by reference to FIG. 4.

In one slot 22, the linear portion 34r is placed on an odd-numbered layer. The linear portion 34a is placed on an even-numbered layer. According to the present embodiment, the first layer is located closest to the inner periphery of the slot 22. The second, third, and fourth layers are located toward the outer periphery.

As illustrated in FIG. 4, the coil 30 includes the first coil group 30A and the second coil group 30B. The first coil group 30A is placed toward the inner periphery in radial direction D2. The second coil group 30B is placed toward the outer periphery of the first coil group 30A. The embodiment of the present invention uses two coil groups comprised of the first coil group 30A and the second coil group 30B. Unquestionably, three or more coil groups may be used as described in PTL 1.

From the viewpoint of inhibiting a decrease in the space factor, the coil 30 is preferably composed of segment coils 31A and 31B as rectangular wires whose cross-sectional shape is rectangular. Unquestionably, it is possible to use coils having a circular cross-section depending on dynamo-electrical machine specifications. The present embodiment uses the segment coils 31A and 31B made of rectangular wires.

As illustrated in FIG. 4, an insulator 40 made of insulating paper, for example, is placed on the inner peripheral wall surface of each slot 22 and surrounds the segment coils 31A and 31B configuring the first coil group 30A and the second coil group 30B. The pair of linear portions 34a and 34r of the segment coils 31A and 31B is inserted and placed in the slot 22 to be layered in radial direction D2. The slot 22 extends in the direction of axis line L of the stator core 21.

Viewed in radial direction D2 of the stator core 21, the linear portion 34r located closest to the inner periphery of the slot 22 is assumed to be the first layer out of the pair of linear portions 34a and 34r of the first segment coil 31A configuring the first coil group 30A. The linear portion 34a of the second segment coil 31A configuring the first coil group 30A is located outside the linear portion 34r in the first layer located closest to the inner periphery. The linear portion 34a is located adjacent to and outside the first layer in radial direction D2 of the stator core 21 and is assumed to be the second layer.

The first segment coil 31A and the second segment coil 31A are equally shaped. The linear portions 34r and 34a of each segment coil 31A are separated by a specified number of pitches and are placed in the multiple slots 22 circularly formed in the stator core 21. An aggregation of these segment coils configures the first coil group 30A.

Similarly, viewed in radial direction D2 of the stator core 21, the linear portion 34r located outside the second layer is assumed to be the third layer out of the pair of linear portions 34a and 34r of the third segment coil 31B configuring the second coil group 30B. The linear portion 34a of the fourth segment coil 31B configuring the second coil group 30B is assumed to be the fourth layer adjacent to and outside the third layer in radial direction D2 of the stator core 21.

The third segment coil 31B and the fourth segment coil 31B are also equally shaped. The linear portions 34r and 34a of each segment coil 31B are separated by a specified number of pitches and are placed in the multiple slots 22 circularly formed in the stator core 21. An aggregation of these segment coils configures the second coil group 30B.

The segment coil 31B is placed toward the outer periphery and causes the length (line length) of the turn portion 33 to be formed longer than that of the segment coil 31A placed toward the inner periphery.

According to the present embodiment, the linear portion 34r of the segment coils 31A and 31B is placed on the odd-numbered layer. The linear portion 34a of the segment coils 31A and 31B is placed on the even-numbered layer. As described above, the pair of linear portions 34a and 34r of the respective segment coils 31A and 31B is placed in the different slots 22 separated by a specified number of pitches in circumferential direction D1 of the stator core 21.

Figure 5:
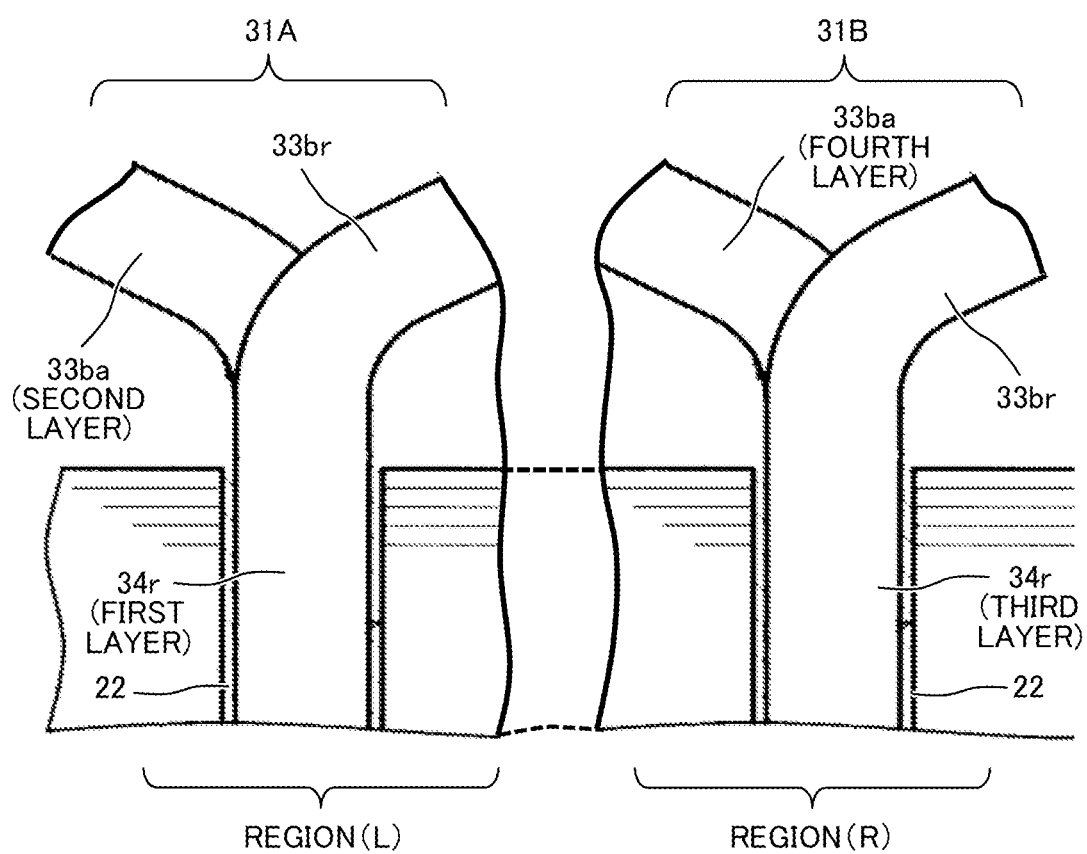
FIG. 5 is an explanatory diagram illustrating the placement of each segment coil inserted in a slot.

FIG. 5 illustrates the positional relationship between the segment coils 31A and 31B when the slot 22 is viewed in the radial direction from the inside to the outside.

The slot 22 (region L) on the left illustrates the segment coil 31A of the first coil group 30A by omitting the segment coil 31B of the second coil group 39B. The slot 22 (region R) on the right illustrates the segment coil 31B of the second coil group 30B by omitting the segment coil 31A of the first coil group 30A.

As seen from the region (L), the linear portion 34r belongs to the first segment coil 31A that is located closest to the inner periphery of the slot 22 and forms the first layer. When viewed in the drawing, the linear portion 34r extends diagonally upward to the right toward the slot 22 (right side of drawing) located at a distance corresponding to a specified number of pitches backward via the intermediate slope portion 33br. The linear portion 34a belongs to the second segment coil 31A forming the second layer adjacent to the outer periphery in the radial direction of the first layer. When viewed in the drawing, the linear portion 34a extends diagonally downward from the slot 22 (left side of drawing) located at a distance corresponding to a specified number of pitches forward via the intermediate slope portion 33ba.

Similarly, as seen from the region (R), the linear portion 34r belongs to the third segment coil 31B that is located toward the outer periphery of the second layer of the slot 22 fright side of drawing) and forms the third layer. When viewed in the drawing, the linear portion 34r extends diagonally upward to the right toward the slot 22 located at a distance corresponding to a specified number of pitches backward via the intermediate slope portion 33br. The linear portion 34a belongs to the fourth segment coil 31B forming the fourth layer adjacent to the outer periphery in the radial direction of the third layer. When viewed in the drawing, the linear portion 34a extends diagonally downward from the slot 22 (left side of drawing) located at a distance corresponding to a specified number of pitches forward via the intermediate slope portion 33ba.

In terms of the segment coils 31A and 31B, the linear portion 34r on the odd-numbered layer in the slot 22 extends diagonally upward to the right in the drawing toward the slot 22 (right side of drawing) located at a distance corresponding to a specified number of pitches backward via the intermediate slope portion 33br. The linear portion 34a on the even-numbered layer extends diagonally downward in the drawing from the slot 22 (left side of drawing) located at a distance corresponding to a specified number of pitches forward via the intermediate slope portion 33ba.

Figure 6:
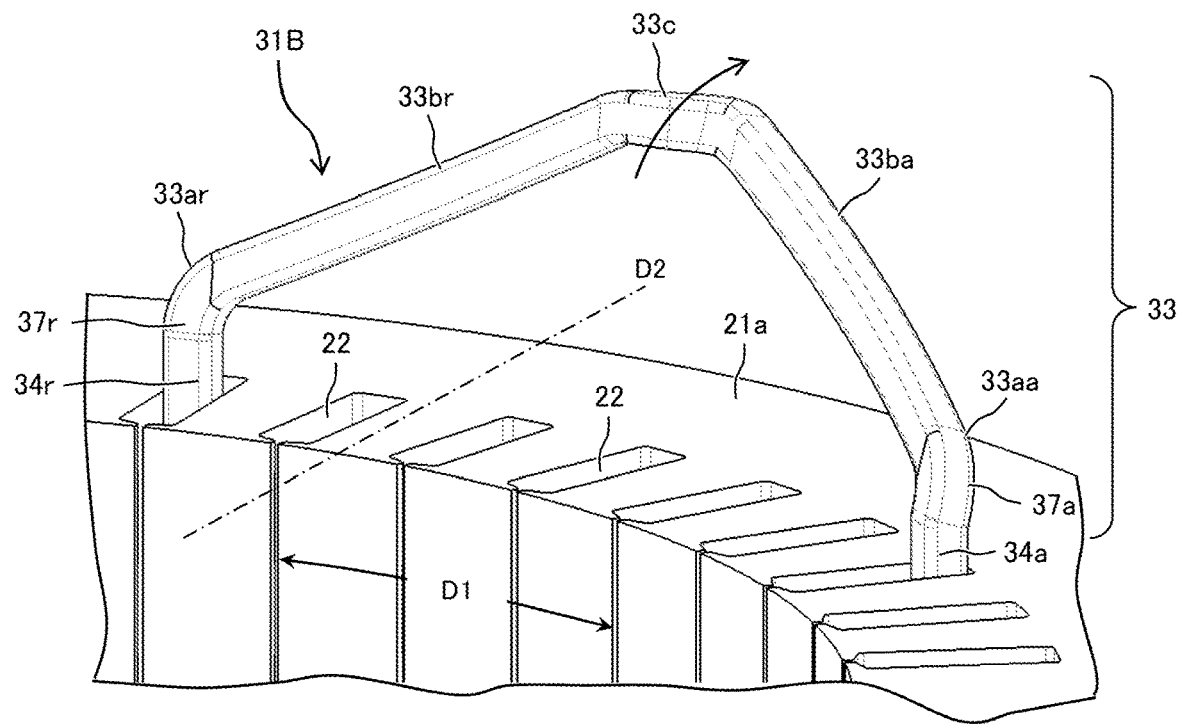
FIG. 6 is an enlarged perspective view illustrating the relationship between the shape of a turn portion of the segment coil and the slot.

FIG. 6 illustrates a configuration of the turn portion 33 under the condition that one segment coil 31 illustrated in FIG. 4 is inserted in slot 22. The example shows the segment coil 31B of the second coil group 30B. As described above, the cross-section of the segment coil 31B is shaped to be rectangular to increase the space factor.

The segment coil 31B configuring the second coil group 30B includes the turn portion 33 and the pair of linear portions 34a and 34r. The turn portion 33 protrudes from the slot 22 in the direction of axis line L of the stator core 21. The linear portions 34a and 34r pass through two specified slots 22. The dynamo-electrical machine 100 according to the present embodiment is characterized by the shape of the turn portion 33 of the segment coil 31 wound around the slot 22 of the stator core 21.

The open ends of the pair of linear portions 34a and 34r of the segment coil 31B pass through the slots 22 in the direction of axis line L of the stator core 21 and protrude outward in the direction of axis line L from the end face portion 21b of the stator core 21 opposite to the end face portion 21a. In the direction of axis line L, the open end protrudes from the end face portion 21b of the stator core 21 opposite to the turn portion 33 and is then used as the connection-side coil end 36 that is successively connected by the connecting portion 32 as illustrated in FIG. 2.

As illustrated in FIG. 6, the turn portion 33 of the segment coil 31B includes the top portion 33c. When viewed in the direction of axis line L, the top portion 33c is located farthest from the end face portion 21a of the stator core 21 and is shaped like a "side" approximately parallel to the end face portion 21a.

The turn portion 33 is connected to both ends of the top portion 33c and includes a pair of intermediate slope portions 33ba and 33br that extends diagonally downward in the drawing to approach the end face portion 21a of the stator core 21. The intermediate slope portions 33ba and 33br are connected to the pair of linear portions 34a and 34r via the connecting portions 33aa and 33ar.

As described above, in terms of the segment coil 31A of the first coil group 30A, the linear portion 34r corresponds to the first layer and the linear portion 34a corresponds to the second layer. Similarly, in terms of the segment coil 31B of the second coil group 30B, the linear portion 34r corresponds to the third layer and the linear portion 34a corresponds to the fourth layer.

The intermediate slope portion 33br, the top portion 33c, and the intermediate slope portion 33ba extend from the linear portion 34r (odd-numbered layer) to the linear portion 34a (even-numbered layer) and thereby tilt by one layer from the inner periphery to the outer periphery from a viewpoint orthogonal to the end face portion 21a of the stator core 21.

As illustrated in FIG. 6, the turn portion 33 is curved in an "inverted V" shape as a whole including the top portion 33c as an apex. The top portion 33c and the intermediate slope portions 33ba and 33br configure the turn portion 33. The turn portion 33 has a tilted shape or is bent outward in the radial direction, beginning at the bent portions 37a and 37r, to approach the end face portion 21a so that the turn portion 33 is positioned outside the stator core 21 in radial direction D2 based on the pair of linear portions 34a and 33r.

Namely, the top portion 33c and the pair of intermediate slope portions 33ba and 33br configuring the turn portion 33 are bent, beginning at the bent portions 37a and 37r, to provide a tilt that largely widens outward in the radial direction corresponding to an approach to the top portion 33c. Before being inserted into the slot 22, the segment coils 31A and 31B are preliminarily formed into the abovementioned shape.

Accordingly, as described above, from the viewpoint orthogonal to the end face portion 21a of the stator core 21, the top portion 33c and the pair of intermediate slope portions 33ba and 33br configuring the turn portion 33 tilt by one layer from the inner periphery to the outer periphery in radial direction D2 of the stator core 21.

Based on axis line L, the top portion 33c and the intermediate slope portions 33ba and 33br tilt, beginning at the bent portions 37a and 37r, to depart from axis line L outward in the radial direction and approach the end face portion 21a.

Figure 7:
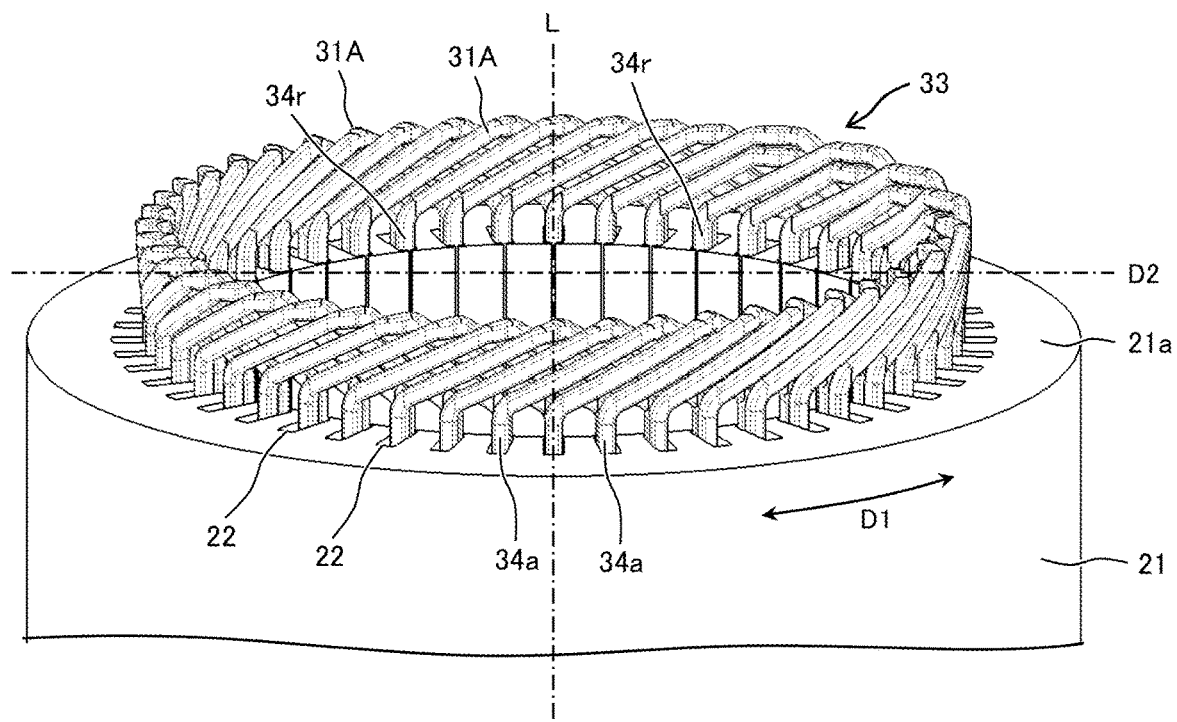
FIG. 7 is an enlarged perspective view illustrating the placement of a first coil group configuring the coil illustrated in FIG. 2.

The segment coil 31 formed as above is inserted and placed in each slot 22. FIG. 7 eliminates the second coil group 30B to easily understand the shape of the segment coil 31 configuring the coil 30.

As illustrated in FIG. 7, the pair of linear portions 34a and 34r of each segment coil 31A in the first coil group 30A is placed in a pair of slots 22 separated at intervals of a specified number of pitches in circumferential direction D1 of the stator core 21. According to the example illustrated in FIG. 7, the pair of linear portions 34a and 34r of each segment coil 31A is placed in a pair of slots 22 separated at intervals of six pitches. In terms of the pair of linear portions 34a and 34r of each segment coil 31A, the linear portion 34r is placed closest to the inside of the stator core 21 in radial direction D2 compared to the linear portion 34a (see FIG. 4).

As described above, the pair of linear portions 34a and 34r of each segment coil 31 in the first coil group 30A is placed in a pair of slots 22 separated at intervals of a specified number of pitches in circumferential direction D1 of the stator core 21. According to the present embodiment, the 48 segment coils 31A are successively placed in the 48 slots 22 of the stator core 21.

The connecting portion 32a and 32r successively connect the ends (connection-side coil ends) opposite to the turn portions 33 of the pair of linear portions 34a and 34r of each segment coil 31A placed in the slots 22. Thus, the multiple segment coils 31A configure the first coil group 30A. Obviously, the second coil group 30B is similarly configured.

Figure 8:
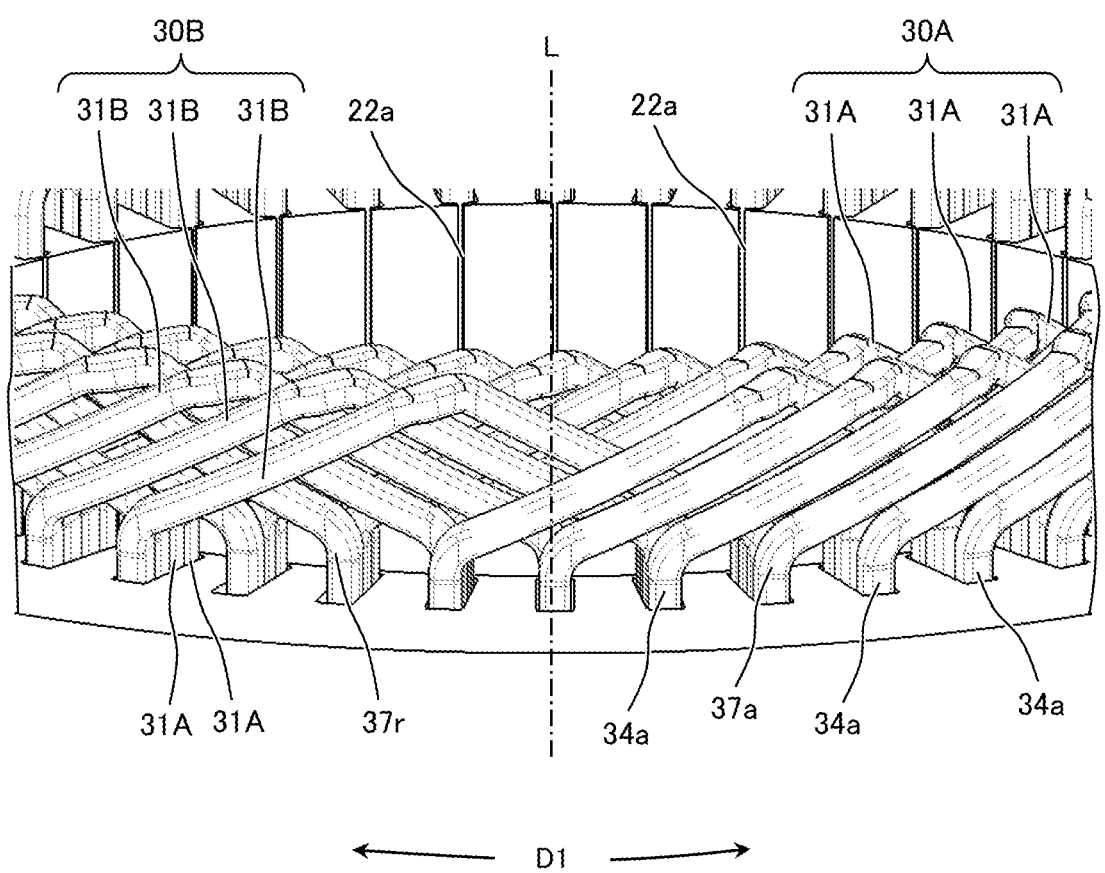
FIG. 8 is an enlarged perspective view illustrating the placement of first and second coil groups configuring the coil illustrated in FIG. 2.

FIG. 8 is a partially enlarged view of the first coil group 30A and the second coil group 30B configuring the coil 30 illustrated in FIG. 2. Concerning some slots 22, the drawing omits the segment coils 31B in the fourth layer located on the outermost periphery.

As illustrated in FIG. 8, the segment coils 31A configure the first coil group 30A placed toward the inner periphery of the slot 22. Compared to the turn portions 33 of the segment coils 31A, the turn portions 33 of the segment coils 31B configuring the second coil group 30B are placed outside the first coil group 30A in radial direction D2 of the stator core 21. Beginning at the bent portions 37a and 37r, the segment coils 31A and 31B tilt to expand outward in radial direction D2.

The first coil group 30A and the second coil group 30B configure the coil 30 wound around the stator 20. "distributed winding of waved winding" is used to wind the coil 30 around the slots 22 of the stator core 21. As described above, there may be provided three or more coil groups.

Figure 9:
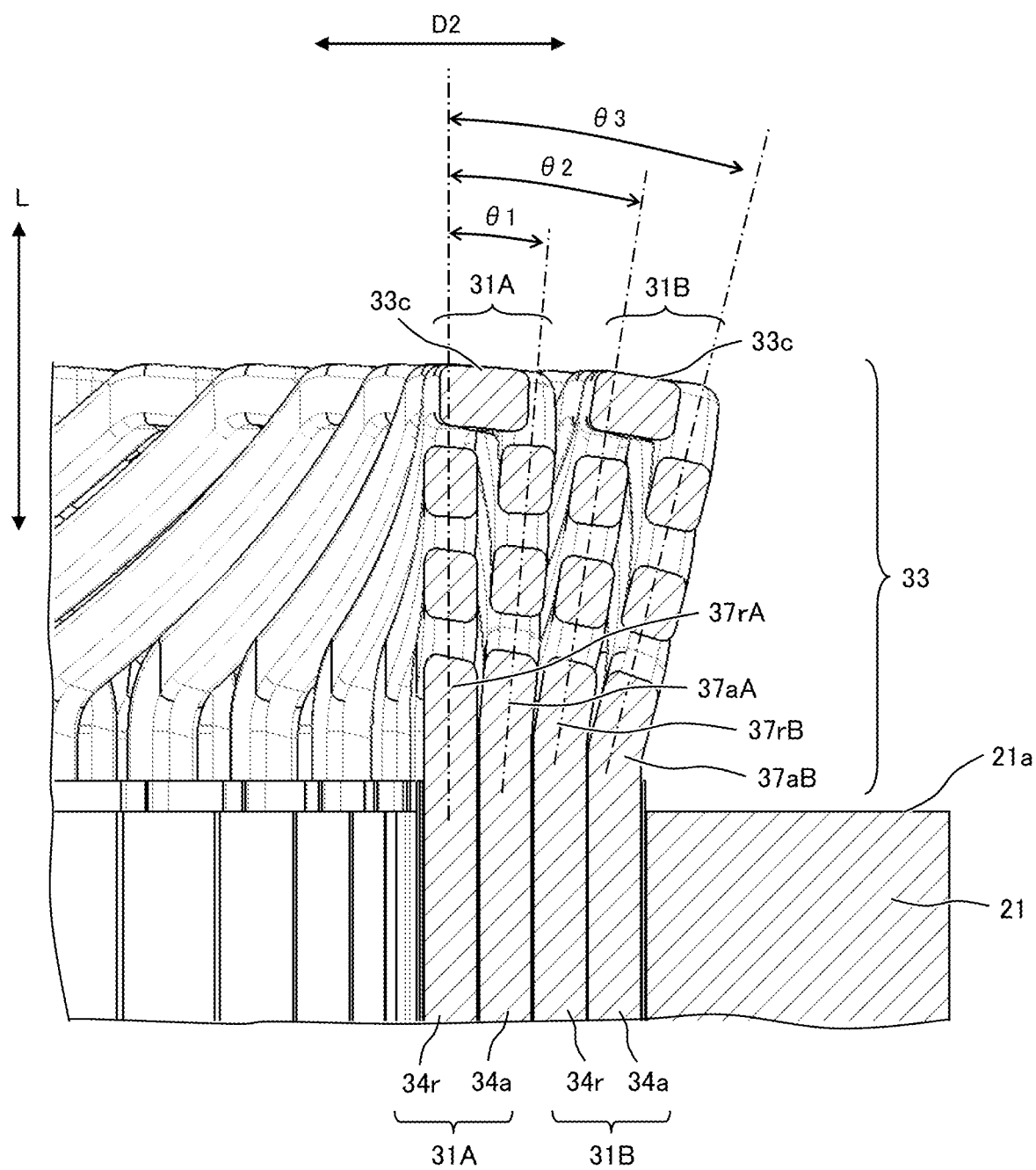
FIG. 9 is an enlarged cross-section of one slot according to a first embodiment of the present invention, viewed from a cross-sectional surface of the stator core in the axial direction.

Based on FIG. 9, the description below explains in detail the specific shape of the turn portion 33 that is characteristic of the present embodiment. FIG. 9 illustrates a cross-section of the slot 22 in FIG. 4 taken on a plane extending in the direction of axis line L and the radial direction, providing cross-section surfaces of the multiple segment coil 31. Parts related to the present embodiment are described below.

As illustrated in FIG. 9, the segment coils 31A and 31B are placed in the same slot 22 according to the placement form illustrated in FIG. 5. The linear portion 34r (first layer) of the first segment coil 31A in the first coil group 30A is placed from the inner periphery toward the outside in the radial direction. The linear portion 34a (second layer) of the second segment coil 31A is placed outside the first layer.

The linear portion 34r (third layer) of the third segment coil 31B in the second coil group 30B is placed outside the linear portion 34a (second layer) of the second segment coil 31A. The linear portion 34a (fourth layer) of the fourth segment coil 31B is arranged outside the third layer.

Viewed from the drawing, the intermediate slope portions 33br connect to the linear portions 34r in the first and third layers and extend to protrude toward the viewpoint against the drawing. Contrastingly, the intermediate slope portions 33ba connect to the linear portions 34a of the second and fourth layers and extend away from the viewpoint to connect to the linear portions 34a in the slot 22.

In FIG. 9, the segment coil 31A to configure the first coil group 30A includes the bent portion denoted as bent portion 37rA corresponding to the linear portion 34r placed in the odd-numbered layer and includes the bent portion denoted as bent portion 37aA corresponding to the linear portion 34a placed in the even-numbered layer. The segment coil 31B to configure the second coil group 30B includes the bent portion denoted as bent portion 37rB corresponding to the linear portion 34r placed in the odd-numbered layer and includes the bent portion denoted as bent portion 37aB corresponding to the linear portion 34a placed in the even-numbered layer.

In the same slot 22, the turn portion 33 to form the bent-side coil end 35 has a tilted shape. Namely, the linear portions 34a and 34r of the layered segment coils 31 are bent outward in radial direction D2 of the stator core 21, beginning at the bent portions 37aA, 37rA, 37aB, and 37rB, based on the direction of axis line L.

The top portion 33c and the pair of intermediate slope portions 33ba and 33br configuring the turn portion 33 gradually tilt outward from axis line L beginning at the bent portions 37aA, 37rA, 37aB, and 37rB. In this case, the top portion 33c is located farthest from axis line L.

As illustrated in FIG. 9, the first segment coil 31A configures the first layer of the first coil group 30A placed toward the innermost periphery in radial direction D2 of the slot 22. The linear portion 34r of the first segment coil 31A has a shape not to form the bent portion 37rA. Namely, the shape allows the linear portion 34r to extend approximately parallel to axis line L and connect with the intermediate slope portion 33br.

If necessary, it may be favorable to form the bent portion 37rA on the linear portion 34r of the first segment coil 31A that configures the first layer of the first coil group 30A.

In the same slot 22, tilt angle θ is formed on the bent portions 37aA, 37rB, and 37aB of the linear portions 34a and 34r of the segment coils 31A and 31B layered in radial direction D2. Tilt angle θ increases in proportion as the linear portions 34a and 34r of the segment coils 31A and 31B are located toward the outer periphery of the slot 22 in radial direction D2. Tilt angle θ signifies an angle formed between axis line L of the stator core 21 and a line segment from the bent portion 37aA, 37rB, or 37aB to the top portion 33c of the turn portion 33.

As illustrated in FIG. 9, the bent portion 37rA of the linear portion 34r forming the first layer of the first segment coil 31A is tilted at tilt angle θ set to "θ=0°," namely, parallel to the axis line L, as described above. Adjacent to the first layer, the bent portion 37aA of the linear portion 34a forming the second layer of the second segment coil 31A is tilted at tilt angle θ set to "θ=θ1" based on the first layer as a reference.

Similarly, adjacent to the second layer, the bent portion 37rA of the linear portion 34r forming the third layer of the third segment coil 31B is tilted at tilt angle θ set to "θ=θ2" based on the first layer as a reference. Adjacent to the third layer, the bent portion 37aA of the linear portion 34a forming the fourth layer of the fourth segment coil 31B is tilted at tilt angle θ set to "θ=θ3" based on the first layer as a reference.

The bent portion 37aA of the second layer has tilt angle θ1. The bent portion 37rB of the third layer has tilt angle θ2. The bent portion 37aB of the fourth layer has angle θ3. There is the relationship of "θ1<θ2<θ3." For example, the present embodiment specifies "θ1=5°," "θ2=7.5°," and "θ3=10°." Tilt angles θ are not limited thereto and may be set to appropriate values.

Angle difference Δθ among tilt angles θ1, θ2, and θ3 is set to be equal to "2.5°," but may be set to be unequal. Angle difference Δθ may increase toward the outside or the inside.

The bent portion 37aA corresponds to the linear portion 34a in the second layer. The bent portion 37rB corresponds to the linear portion 34r in the third layer. The bent portion 37aB corresponds to the linear portion 34a in the fourth layer. The bent portions 37aA, 37rB, and 37aB are formed to approach the end face portion 21a of the stator core 21 toward the outer periphery of the slot 22 in radial direction D2 when viewed in the direction of axis line L. Similarly, the top portion 33c is also formed to approach the end face portion 21a of the stator core 21 as the turn portion 33 is located toward the outer periphery in radial direction D2 of the slit 22 when viewed in the direction of axis line L.

The resultant effect is to be able to shorten the line length of the turn portion of the segment coil 31B located toward the outer periphery. This will be described by reference to FIGS. 12 and 13.

Figure 10:
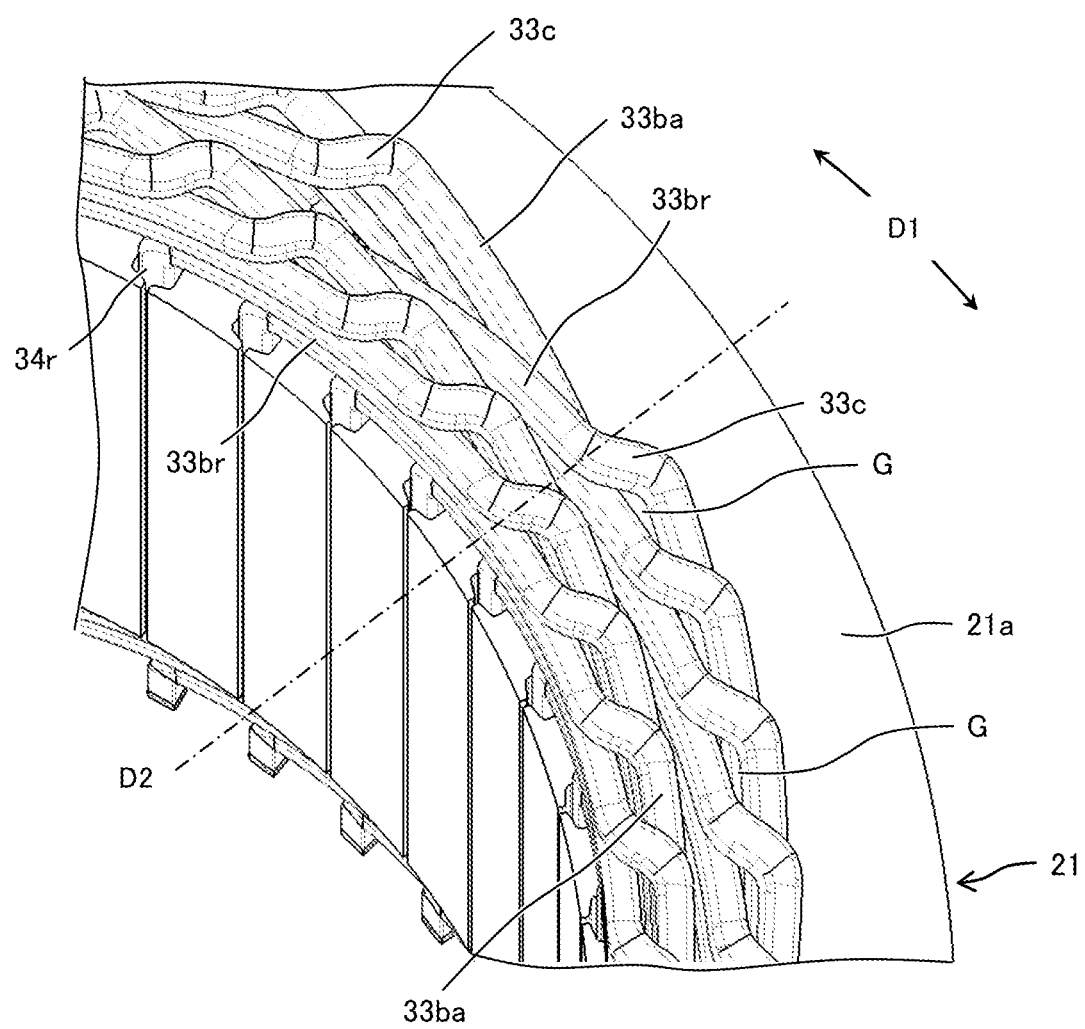
FIG. 10 is an enlarged perspective view of the first and second coil groups illustrated in FIG. 8, viewed from a different viewpoint.

FIG. 10 illustrates the first coil group 30A and the second coil group 30B illustrated in FIG. 8 from a different viewpoint. As illustrated in FIG. 10, the two segment coils 31A and 31B are adjacent to each other in circumferential direction D1 of the stator core 21. The segment coils 31A and 31B face each other, including gap G in radial direction D2 of the stator core 21 between two top portions 33c adjacent to each other in circumferential direction D1. Gap G allows the cooling medium to flow smoothly into the turn portion 33, efficiently cooling the coil 30.

As described above, the dynamo-electrical machine 100 according to the present embodiment includes the stator core 21, the multiple slots 22 provided in the stator core 21, and the segment coils 31A and 31B placed in the slot 22.

As illustrated in FIG. 3, the segment coils 31A and 31B include a pair of linear portions 34a and 34r placed in different slots 22 and the turn portion 33 connecting the pair of linear portions 34a and 34r. The turn portion 33 includes a pair of intermediate slope portions 33ba and 33br connected to the linear portions 34a and 34r.

The bent portions 37a and 37r are provided between the turn portion 33 and each of the linear portions 34a and 34r. Tilt angle θ of the bent portions 37a and 37r increases toward the outer periphery of the slot 22 in radial direction D2. As described above, the bent portion 37aA formed with the linear portion 34a in the second layer has tilt angle θ1. The bent portion 37rB formed with the linear portion 34r in the third layer has tilt angle θ2. The bent portion 37aB formed with the linear portion 34a in the fourth layer has angle θ3. There is the relationship of "θ1<θ2<θ3."

The bent portions 37a and 37r are bent so that the turn portion 33 is tilted away from axis line L in proportion as the segment coils 31A and 31B are located toward the outer periphery in radial direction D2 of slot 22. Namely, the top portion 33c and the intermediate slope portions 33ba and 33br are bent to approach the end face portion 21a of the stator core 21 when viewed in the direction of axis line L in proportion as the segment coil 31 is located toward the outer periphery in radial direction D2 of the slot 22.

The top portion 33C and the intermediate slope portions 33ba and 33br form the turn portion 33 for each of the two segment coils 31A and 31B configuring the first coil group 30A and the second coil group 30B. It is possible to enlarge a space among the top portion 33C and the intermediate slope portions 33ba and 33br toward the outside in radial direction D2.

Therefore, mechanical interference can be avoided due to the sufficient gap between the turn portions 33 adjacent to each other in stator direction D1 of the stator core 21. Moreover, a cooling medium can easily enter the gap. An effective contact area between the coil and the cooling medium increases. The cooling performance can be improved.

Two top portions 33c adjacent to each other in the originating direction D1 face each other, including gap G in radial direction D2. A cooling medium can easily enter gap G. A contact area between the coil 30 and the cooling medium increases. The cooling performance can be improved.

The segment coils 31A and 31B are adjacent to each other in circumferential direction D1 of the stator core 21. As illustrated in FIG. 10, the segment coils 31A and 31B face each other, including gap G in radial direction D2 of the stator core 21 between two top portions 33c adjacent to each other in circumferential direction D1.

As described above, it is possible to more effectively and reliably avoid the mechanical interference between the segment coils 31A and 31B adjacent to each other in circumferential direction D1 of the stator core 21.

As described above, the dynamo-electrical machine 100 according to the present embodiment can avoid the interference of the turn portion 33 of the bent-side coil ends 35A and 35B and improve the cooling performance without increasing the length of coil end 35.

Example 2

The description below explains a second embodiment of the present invention. According to the first embodiment, the bent portion 37aA formed with the linear portion 34a in the second layer has tilt angle θ1. The bent portion 37rB formed with the linear portion 34r in the third layer has tilt angle θ2. The bent portion 37aB formed with the linear portion 34a in the fourth layer has angle θ3. There is the relationship of "θ1<θ2<θ3."

According to the second embodiment, similarly, the bent portion 37aA formed with the linear portion 34a in the second layer has tilt angle θ1. The bent portion 37rB formed with the linear portion 34r in the third layer has tilt angle θ2. The bent portion 37aB formed with the linear portion 34a in the fourth layer has angle θ3. However, there is the relationship of "θ1=θ2=θ3."

Figure 11:
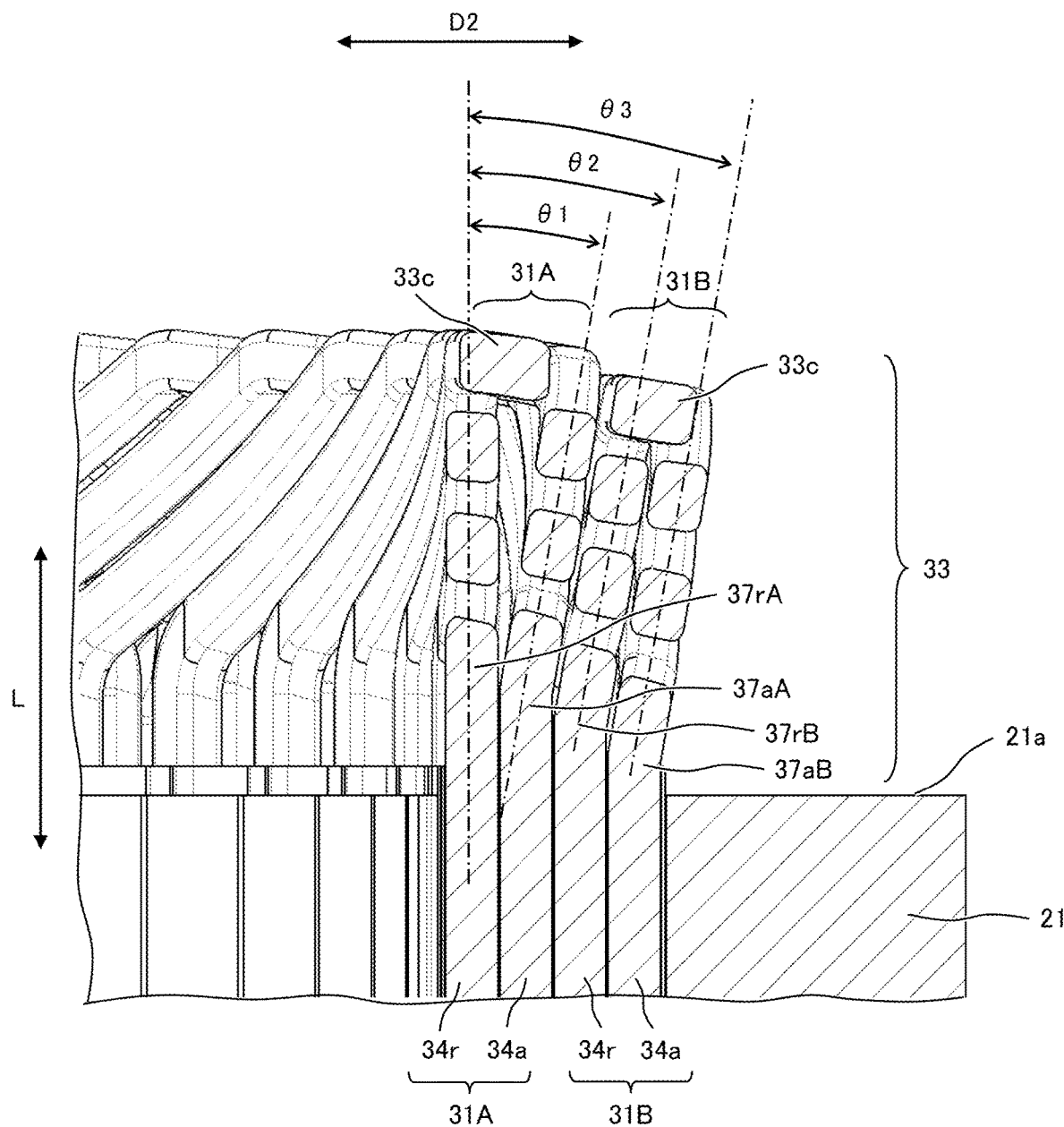
FIG. 11 is an enlarged cross-section of one slot according to a second embodiment of the present invention, viewed from a cross-sectional surface of the stator core in the axial direction.

As illustrated in FIG. 11, the linear portion 34r forming the first layer of the first segment coil 31A includes the bent portion 37rA whose tilt angle θ is set to "θ=0°," namely, parallel to the axis line L, as described above. Adjacent to the first layer, the linear portion 34a forming the second layer of the second segment coil 31A includes the bent portion 37aA whose tilt angle θ is set to "θ=v1" based on the first layer as a reference.

Similarly, adjacent to the second layer, the linear portion 34r forming the third layer of the third segment coil 31B includes the bent portion 37rA whose tilt angle θ is set to "θ=θ2" based on the first layer as a reference. Adjacent to the third layer, the linear portion 34a forming the fourth layer of the fourth segment coil 31B includes the bent portion 37aA whose tilt angle θ is set to "θ=θ3" based on the first layer as a reference.

The bent portion 37aA of the second layer has tilt angle θ1. The bent portion 37rB of the third layer has tilt angle θ2. The bent portion 37aB of the fourth layer has angle θ3. There is the relationship of "θ1=θ2=θ3." For example, the present embodiment specifies "θ1=θ2=θ3=10°."

The turn portion 33 is tilted outward in the radial direction even when tilt angles θ are equal. It is possible to ensure a large space that contains the segment coils 31A and 31B.

Therefore, mechanical interference can be avoided due to the sufficient gap between the turn portions 33 adjacent to each other in stator direction D1 of the stator core 21. Moreover, a cooling medium can easily enter the gap. An effective contact area between the coil and the cooling medium increases. The cooling performance can be improved.

Two top portions 33c adjacent to each other in circumferential direction D1 face each other, including gap G in radial direction D2. A cooling medium can easily enter gap G. A contact area between the coil and the cooling medium increases. The cooling performance can be improved.

Similarly to the first embodiment, the two top portions 33c adjacent to each other in circumferential direction D1 face each other, including gap G in radial direction D2 of the stator core 21. As described above, it is possible to more effectively and reliably avoid the mechanical interference between the segment coils 31A and 31B adjacent to each other in circumferential direction D1 of the stator core 21.

The description below explains line lengths of the turn portions 33 of the segment coil 31A toward the inner periphery and the segment coil 31B toward the outer periphery.

Figure 12:
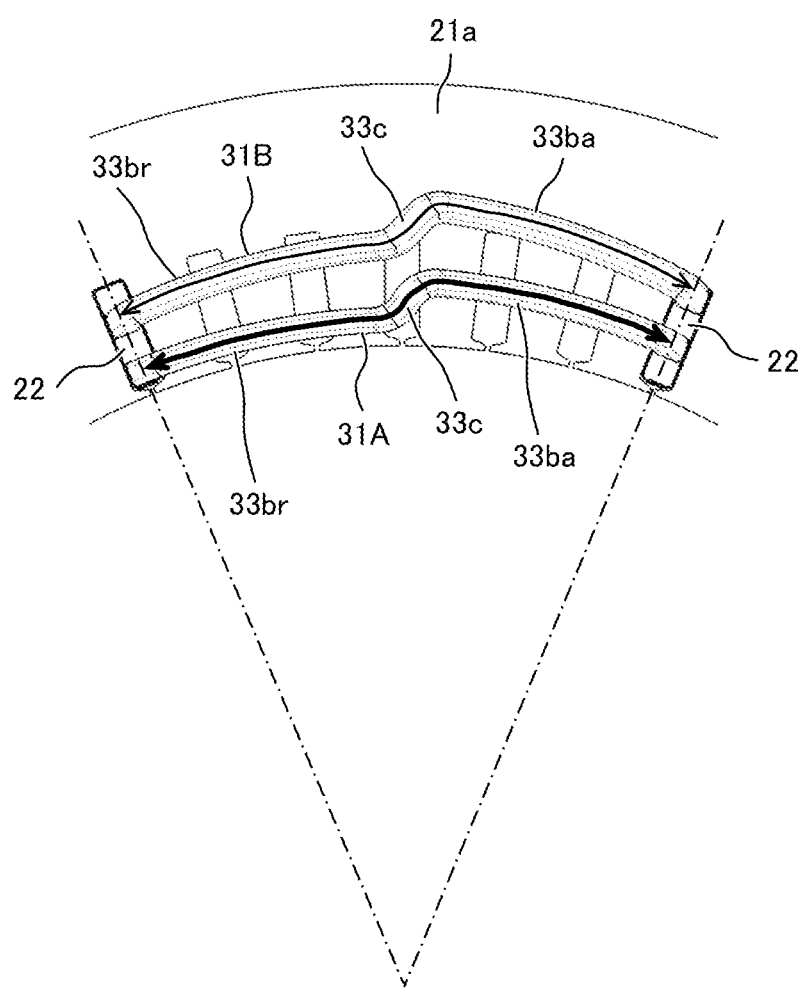
FIG. 12 is an explanatory diagram illustrating the length of the turn portion of each of the segment coil located toward the inner periphery and the segment coil located toward the outer periphery.

FIG. 12 illustrates line lengths of the turn portions 33 of the segment coil 31A located toward the inner periphery and the segment coil 31B located toward the outer periphery. As seen from FIG. 12, the segment coil 31B is located toward the outer periphery corresponding to a longer radius and causes the line length to be longer than that of the segment coil 31A. The segment coil 31B accordingly increases coil resistance and the amount of heat generation. The effect of only one segment coil 31B is negligible. However, as many as n segment coils 31B are connected in series to be used. The coil resistance is multiplied n times, causing an unignorable effect.

According to the first and second embodiments, the segment coil 31A configuring the first coil group 30A includes the bent portion 37rA formed as a bent portion of the linear portion 34r placed in the odd-numbered layer and the bent portion 37aA formed as a bent portion of the linear portion 34a placed in the even-numbered layer. The segment coil 31B configuring the second coil group 30B includes the bent portion 37rB formed as a bent portion of the linear portion 34r placed in the odd-numbered layer and the bent portion 37aB formed as a bent portion of the linear portion 34a placed in the even-numbered layer. Then, the following relationship applies.

Figure 13:
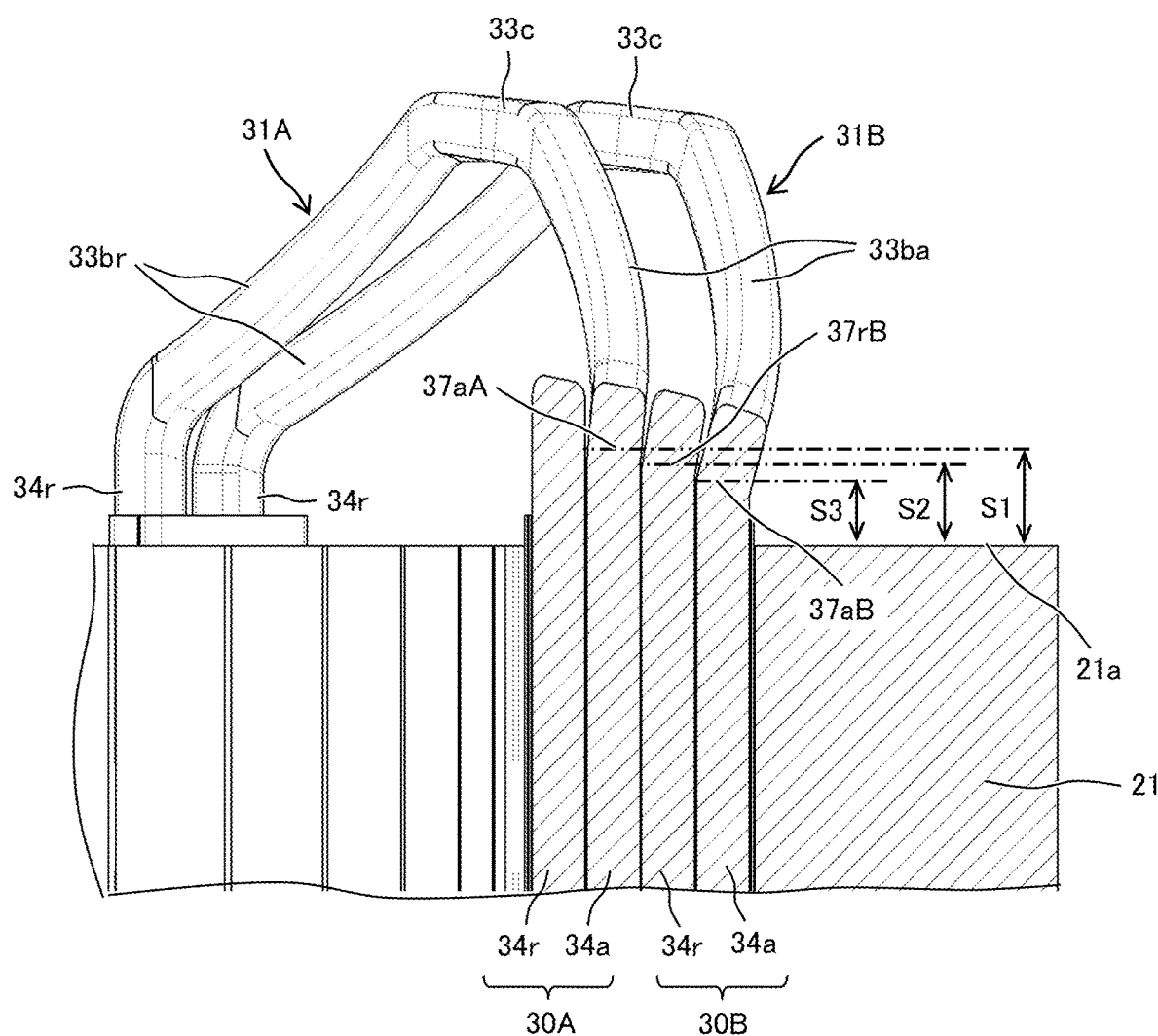
FIG. 13 is an explanatory diagram illustrating the reason to be able to shorten the turn portion of the segment coil located toward the outer periphery illustrated in FIG. 12.

As illustrated in FIG. 13, the linear portion 34a in the second layer corresponds to the bent portion 37aA. The linear portion 34r in the third layer corresponds to the bent portion 37rB. The linear portion 34a in the fourth layer corresponds to the bent portion 37aB. When viewed in the direction of axis line L, the bent portions 37aA, 37rB, and 37aB are formed to approach the end face portion 21a of the stator core 21 toward the outer periphery of the slot 22 in radial direction D2.

There is length "S1" from a folding point of the bent portion 37aA of the linear portion 34a in the second layer to the end face portion 21a of the stator coil 21. There is length "S2" from a folding point of the bent portion 37rB of the linear portion 34r in the third layer to the end face portion 21a of the stator coil 21. There is length "S3" from a folding point of the bent portion 37aB of the linear portion 34a in the fourth layer to the end face portion 21a of the stator coil 21. The lengths S1, S2, and S3 have the relationship of "S3<S2<S1."

The result is to shorten the length from the bent portions 37aB and 37rB of the segment coil 31B located toward the outer periphery to the end face portion 21a of the stator coil 21. It is possible to shorten the line length of the turn portion 33 of segment coil 31B located toward the outer periphery. It is also possible to inhibit an increase in coil resistance and the amount of heat generation. The present embodiment specifies positions to form the bent portions 37rA, 37aA, 37rB, and 37aB so that the segment coil 31A toward the inner periphery and the segment coil 31B toward the outer periphery include the respective turn portions 33 configured to maintain approximately the same length.

As described above, the segment coil according to the present invention is configured to include a first linear portion, a second linear portion, and a turn portion. The first linear portion is inserted into a specified slot. The second linear portion is inserted into another particular slot different from the specified slot. The turn portion extends from one end face portion of the stator core toward the outside of the axial direction of the stator core and includes a top portion connecting the first linear portion and the second linear portion. The linear portions of the multiple segment coils are inserted and placed in the slots in a layering manner from the inner periphery to the outer periphery in the radial direction. A bent portion is formed between the linear portion and the turn portion of each of the segment coils layered in the radial direction. The bent portion tilts the top portion of the turn portion toward the end face of the stator core.

The turn portion extending from the end face portion of the stator core is bent outward in the radial direction. Consequently, a sufficient gap is formed between the turn portions of the segment coils. A cooling medium can easily enter the gap. An effective contact area between the coil and the cooling medium increases. The cooling performance can be improved for these reasons.

The present invention is not limited to the abovementioned embodiments and includes various modifications. For example, the embodiments are described in detail to explain the present invention in an easy-to-understand fashion. The present invention is not necessarily limited to all the configurations described above. It is possible to replace part of the configuration of one embodiment with the configuration of another embodiment. The configuration of one embodiment can additionally include the configuration of other embodiments. Further, part of the configuration of each embodiment can be subject to the addition, deletion, or replacement of other configurations.

REFERENCE SIGNS LIST

21 . . . stator core
22 . . . slot
30 . . . coil
30A . . . first coil group
30B . . . second coil group
31A . . . segment coil
31B . . . segment coil
33 . . . turn portion
33aa . . . connecting portion
33ar . . . connecting portion
33ba . . . intermediate slope portion
33br . . . intermediate slope portion
33c . . . top portion
34a . . . linear portion
34r . . . linear portion
37aA . . . bent portion
37rA . . . bent portion 37aB . . . bent portion
37rB . . . bent portion
100 . . . dynamo-electrical machine
D1 . . . circumferential direction
D2 . . . radial direction
G . . . gap
L . . . axis line

The invention claimed is:

1. A dynamo-electrical machine comprising a stator including a stator core having a plurality of slots and a plurality of segment coils placed in the slots of the stator core,
   wherein the segment coil includes a first linear portion inserted into a specified slot, a second linear portion inserted into another particular slot different from the specified slot, and a turn portion, including a top portion, that extends from one end face portion of the stator core toward the outside of an axial direction of the stator core and is bent to connect the first linear portion and the second linear portion;
   wherein the linear portions of a plurality of the segment coils are inserted and placed in the slots in a layering manner from an inner periphery to an outer periphery in a radial direction;
   wherein a bent portion is formed between the linear portion and the turn portion of each of the segment coils layered in a radial direction and tilts the turn portion in a direction in which the top portion of the turn portion approaches the end face of the stator core, and the turn portions are inclined at an angle that avoids mechanical interference between adjacent turn portions and forms a gap through which a cooling medium passes; and
   wherein a position of the bent portion as a starting point to tilt the turn portion, approaches the end face portion of the stator core in proportion as the segment coil is located toward the outer periphery of the slot.

2. The dynamo-electrical machine according to claim 1, wherein the turn portion of each of the segment coils increases a tilt in proportion as the segment coil is located toward the outer periphery of the slot.

3. The dynamo-electrical machine according to claim 1, wherein the turn portions of the segment coils are equally tilted regardless of positions of the segment coils in the slot.

4. The dynamo-electrical machine according to claim 2, wherein a plurality of the segment coils form at least a first coil group located toward an inner periphery of the stator core and a second coil group located toward the outer periphery of the first coil group; and
   wherein a line length of the turn portion of the segment coil in the first coil group is approximately equal to a line length of the turn portion of the segment coil in the second coil group.

5. The dynamo-electrical machine according to claim 2, wherein a plurality of the segment coils form at least a first coil group located toward an inner periphery of the stator core and a second coil group located toward the outer periphery of the first coil group;
   wherein the turn portion of the segment coil is formed with the top portion between intermediate slope portions connecting the first linear portion and the second linear portion; and
   wherein the segment coils to form the first coil group and the second coil group allow the two adjacent turn portions to face each other, including a gap between the two adjacent top portions in a radial direction of the stator core.

6. A dynamo-electrical machine comprising a stator including a stator core having a plurality of slots and a plurality of segment coils placed in the slots of the stator core,
   wherein the segment coil includes a first linear portion inserted into a first slot, a second linear portion inserted into a second slot different from the first slot, and a turn portion, including a top portion, that is bent to connect the first linear portion and the second linear portion;
   wherein a plurality of the segment coils form at least a first coil group located toward an inner periphery of the stator core and a second coil group located toward an outer periphery of the first coil group;
   wherein, in the first slot and the second slot, the first linear portion of the segment coil forming the first coil group is placed as a first layer toward the innermost periphery of the first slot and the second slot, and the second linear portion of the segment coil forming the first coil group is placed as a second layer at an outer periphery of the first layer in the first slot and the second slot;
   wherein, in the first slot and the second slot, the first linear portion of the segment coil forming the second coil group is placed as a third layer at an outer periphery of the second layer in the first slot and the second slot, and the second linear portion of the segment coil forming the second coil group is placed as a fourth layer at an outer periphery of the third layer in the first slot and the second slot;
   wherein a bent portion is formed between the linear portion and the turn portion extending from the linear portion from the second layer to the fourth layer, and the bent portion is bent so that a line segment leading to the top portion tilts beginning at the bent portion as a starting point outward in a radial direction and in a direction away from the axis line of the stator core, and the turn portions are inclined at an angle that avoids mechanical interference between adjacent turn portions and forms a gap through which a cooling medium passes; and
   wherein a position of the bent portion as a starting point to tilt the turn portion, approaches an end face portion of the stator core in proportion as the segment coil is located toward the outer periphery of the slot.

7. The dynamo-electrical machine according to claim 6, wherein tilt angle θ signifies an angle formed between a line segment from the bent portion as a starting point leading to the top portion of the turn portion and an axis line of the stator core;
   wherein a line segment leading to the top portion of the second layer tilts at tilt angle θ1, a line segment leading to the top portion of the third layer tilts at tilt angle θ2, and a line segment leading to the top portion of the fourth layer tilts at tilt angle θ3; and
   wherein the inclination angles θ1, θ2, and θ3 maintain a relationship of θ1<θ2<θ3.

8. The dynamo-electrical machine according to claim 6, wherein tilt angle θ signifies an angle formed between a line segment from the bent portion as a starting point leading to the top portion of the turn portion and an axis line of the stator core;
   wherein a line segment leading to the top portion of the second layer tilts at tilt angle θ1, a line segment leading to the top portion of the third layer tilts at tilt angle θ2, and a line segment leading to the top portion of the fourth layer tilts at tilt angle θ3; and wherein the inclination angles $\theta 1$, $\theta 2$, and $\theta 3$ maintain a relationship of $\theta 1 = \theta 2 = \theta 3$.

* * * * *